Figure 4:
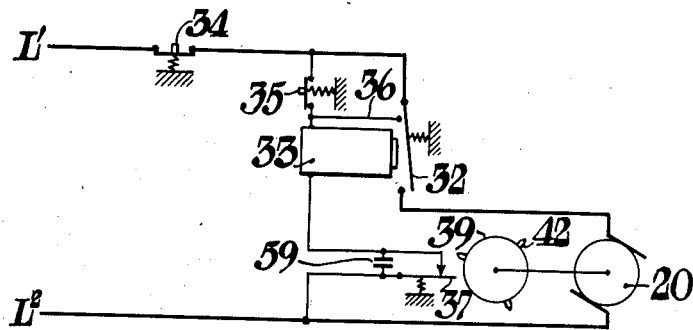

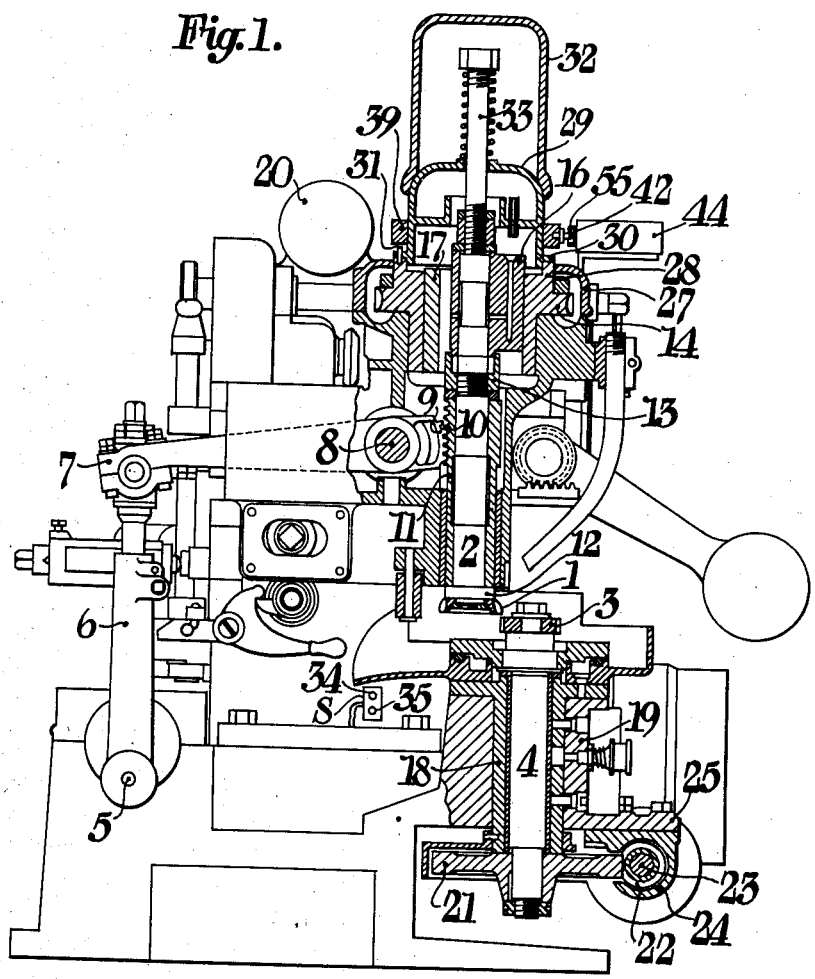

June 6, 1939.  L. D. MARTIN  2,161,365
CONTROL MECHANISM FOR GEAR SHAPING MACHINES
Filed June 23, 1937  3 Sheets-Sheet 2
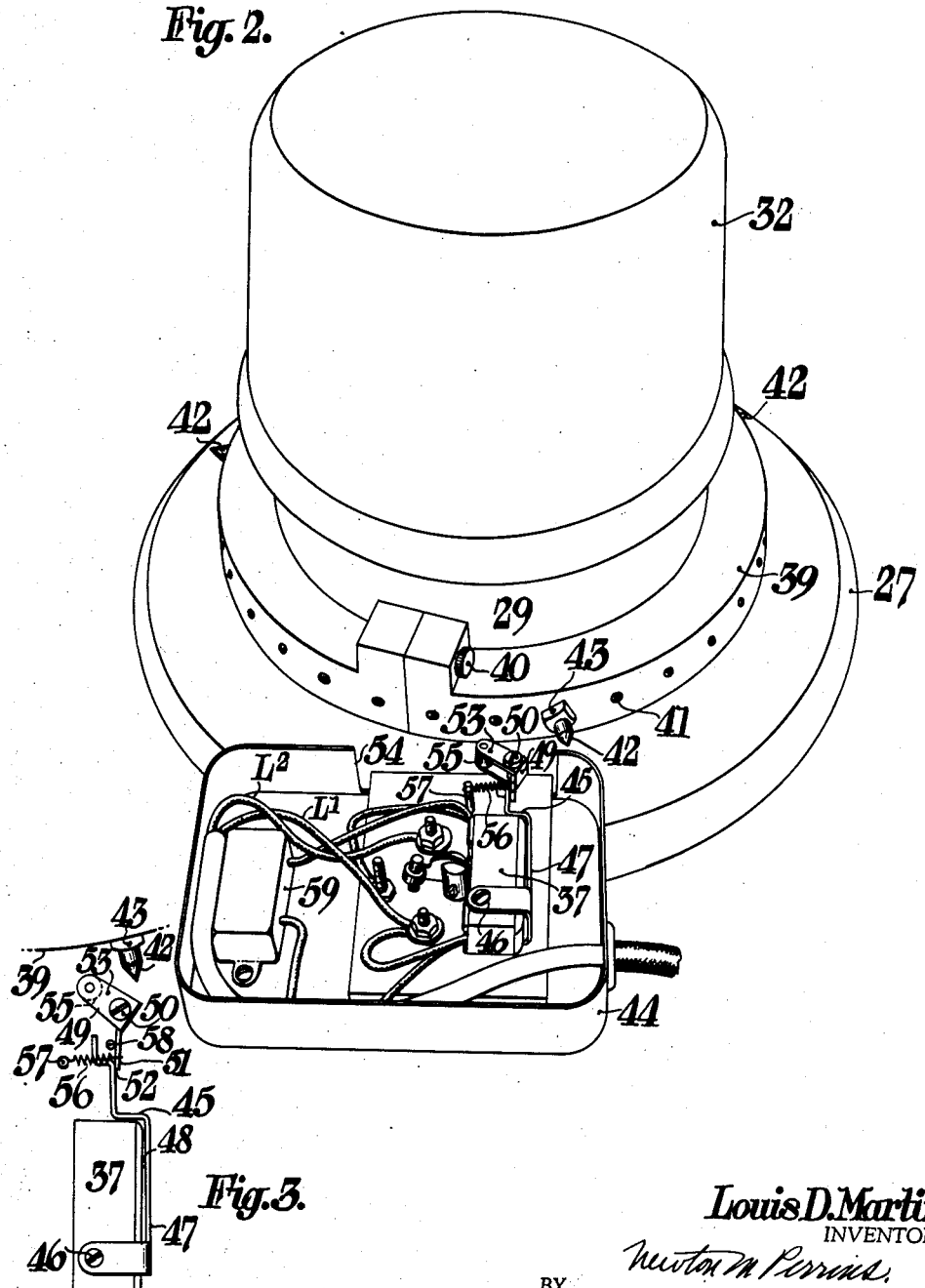
Louis D. Martin,
INVENTOR.
BY
ATTORNEYS.

June 6, 1939.  L. D. MARTIN  2,161,365
CONTROL MECHANISM FOR GEAR SHAPING MACHINES
Filed June 23, 1937  3 Sheets-Sheet 3

Louis D. Martin,
INVENTOR:
BY
ATTORNEYS.

Patented June 6, 1939

2,161,365

UNITED STATES PATENT OFFICE 2,161,365

CONTROL MECHANISM FOR GEAR SHAPING MACHINES

Louis D. Martin, Rochester, N. Y., assignor to Eastman Kodak Company, Rochester, N. Y., a corporation of New Jersey Application June 23, 1937, Serial No. 149,899

9 Claims. (Cl. 90—9)

The present invention relates to gear shaping machines, and particularly to a controlling means for automatically stopping a machine of this type when the cutter spindle and the work spindle have reached predetermined relative positions.

It is common practice with gear shaping machines to use the so called gap cutters which are cutters of the gear shaping type having one or more gaps or open spaces at one side wide enough to permit the placement of the cutter and a gear blank in pitch circle relationship without bringing them into actual contact, when both are in the same plane, and by making the cutter of sufficiently large radius to accommodate the periphery between gaps and leave enough teeth to generate and cut the full number of teeth required to be cut in the gear blank in consequence of rotational feed only, combined of course with reciprocated travel, and without any depth feed in the radial direction. Gap cutters of this type have been formed having a plurality of gaps for use especially where small gears are being cut, and in order to insert a new gear blank in position on the work spindle in place of one already formed, the machine must be stopped so that the cutter spindle is in a position where one of the gaps in the cutter comes opposite the work spindle. It will be appreciated that since gear shapers of this type usually run at high speed, it would be next to impossible for an operator to manually stop one of these machines consistently so that the cutter spindle and the work spindle would be in proper position whereby the gap in the cutter would come opposite the work spindle.

Therefore, the principal object of the present invention is the provision of a control device for a machine which will automatically stop certain rotating elements of the machine in a predetermined relation with other rotating elements of the machine. Another object is the provision of such a control device which when applied to a gear shaping machine using a gap cutter will automatically stop the machine so that the cutter spindle and work spindle can be automatically stopped in predetermined relative position whereby the gap in the cutter will be opposite the work spindle so that a gear blank can be placed on a work spindle in proper position. And still another object is the provision of such a control device which can be easily applied to or removed from any high speed gear shaper without necessitating any alteration in the machine itself. And yet another object is the provision of a control device of the type described which is exceedingly simple, and easily adjustable to give varying conditions of control necessary for different machine setups.

It will be obvious from the following description of my novel control device, that such a device is applicable to any machine where it might be desirous to stop certain rotating elements of the machine at a predetermined position relative to any other rotating element of said machine. However, for the purpose of illustration, I have shown my control device connected to a well known high-speed gear shaping machine, and particularly to such a machine equipped with a gap cutter since a gear shaping machine using a gap cutter provides a good illustration of the application of my control device as well as showing its advantages and the ease with which it can be manipulated.

Figure 5:
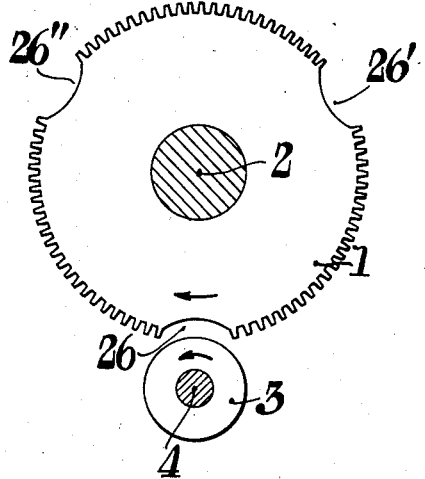
Figure 6:
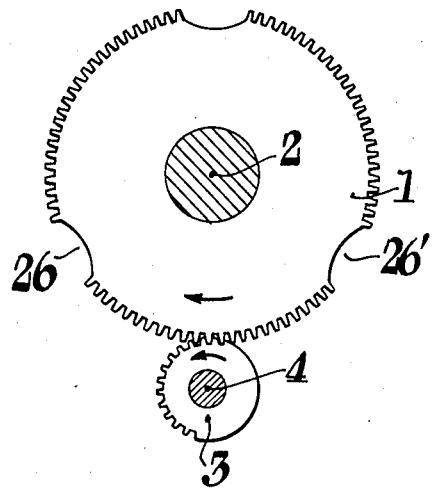

The novel features that I consider characteristic of my invention are set forth with particularity in the appended claims. The invention itself, however, both as to its organization and its method of operation, together with additional objects and advantages thereof, will best be understood from the following description of the specific embodiments when read in connection with the accompanying drawings in which, Fig. 1 is a front view of a well-known high-speed gear shaping machine partly in elevation and partly in section to show the main operating parts, and showing my novel control device mounted thereon, Fig. 2 is an enlarged perspective of that part of the machine to which my control device is applied, and shows said control device in detail, Fig. 3 is a plan view of the switch of my novel control device, and showing in detail how it is operated from the cutter spindle, Fig. 4 is a wiring diagram of the circuit for controlling the operation of the machine, and including the novel control device, Fig. 5 is a plan view showing one form of gap cutter in a position relative to the work spindle for permitting the gear blank to be placed on said work spindle, and Fig. 6 is a plan view similar to Fig. 5 but showing the gap cutter and work spindle in cutting relation.

Like reference characters refer to corresponding parts throughout the drawings.

The gear shaping machine per se on which my novel control device is shown is similar to the one shown in U. S. Patent 1,478,472, to E. R. Fellow, December 25, 1923, to which patent reference can be had for a detailed description of said machine. Since this gear shaping machine per se forms no part of the present invention other than to illustrate the application thereof, I deem it unnecessary to describe said gear shaping machine other than to identify the main parts thereof along with their functions for the purpose of showing the application of my novel control device in connection therewith.

Referring now to Fig. 1, 1 is the cutter which is mounted upon a rotatable and reciprocable cutter spindle 2, and 3 is the work piece or gear blank mounted upon a rotatable work spindle 4. The cutter spindle 2 is reciprocated by a mechanism consisting of a crank pin 5, a connecting rod 6, and a lever 7 pivoted on a stud 8, and having a segment arm 9 which meshes with rack teeth 10 on a sleeve 11 which fits the cutter spindle and is confined between shoulders or abutments 12 and 13. Rotation is imparted to the cutter spindle by a worm wheel 14, the spindle being engaged slidingly but not rotatably with the worm wheel through the medium of a semi-cylindrical shoe 16 carried by the spindle and a complemental semi-cylindrical guide 17 secured to the interior of the worm wheel and its hub.

The work spindle 4 is seated rotatably within a quill 18 which is secured to an apron 19 pivoted to the main frame. A worm wheel 21 is secured to the work spindle 4, which rotates it; and is itself rotated by a worm 22 secured to a shaft 23 contained in a housing 24. This housing with its bearings for the worm shaft is secured to a ledge or lip 25 projecting laterally of the apron 19.

Power for driving these mechanisms is derived from an electric motor 20 mounted atop the machine, said motor being started and stopped by a manually controlled stop and start switch, indicated broadly as S in Fig. 1, which can be located any place on the machine so long as it is convenient for the operator. In practice, the driving connection between the motor and the above-mentioned mechanism, usually includes a main drive shaft which is connected to the motor by a belt and to which the mechanisms are connected by suitable gearing, not shown; and said driving connection must be designed so that the cutter and work spindles 2 and 4 respectively will be driven at such speed that the cutter 1 and the gear blank 3 will be rotated at the same linear velocity at their pitch line. In the illustrated machine these spindles are rotated in unison.

Referring now to Figs. 5 and 6, the cutter 1 is shown as being of the well known gap type which permits a gear blank 3 to be placed on the work spindle 4 without necessitating a radial movement of either the cutter spindle or the work spindle 4 relative to one another. In Fig. 5 the cutter spindle 2 and the work spindle 4 are shown in one position in which a new gear blank 3 can be placed on a work spindle 4. The gear blank 3 is mounted on the work spindle beside the gap 26 in the periphery of the cutter, where no teeth are present. As this blank and the cutter are rotated in harmony, see Fig. 6, the work is cut with the proper number of teeth by the time it reaches the succeeding gap 26' whereupon the machine is stopped and a new blank is placed on the work spindle in place of the one just cut. For the purpose of illustration, I have chosen to show the simplest form of gap cutter arrangement wherein the number of teeth between the gaps is equal to the number of teeth cut on the gear blank and wherein the teeth on the blank are finished with a single stroke of the cutter. However, it is to be understood that any type of gap cutter, regardless of the number of gaps it contains, or whether it cuts a blank in one or more steps, can be used on this machine and still be controlled by my novel control device.

Referring to Fig. 5, it will be appreciated that since the gap 26 in the cutter 1 is just large enough to receive the gear blank 3 on the work spindle when the cutter is stopped in a predetermined position relative to the work spindle, it would be impossible for an operator to manually stop the machine consistently so that the cutter would assume this position, especially when the machine is operating at high speed for mass production of a given part. My control device is adapted when applied to such a gear shaping machine to automatically stop said machine so that the cutter spindle will stop at a predetermined position relative to the work spindle whereby a gap in the cutter will be opposite the work spindle for the insertion of a new gear blank on said spindle.

Referring now to Fig. 1, the worm gear 14 is enclosed in a gear housing 27 which is open at the top to allow the shoulder 28 on the worm wheel 14 to extend therethrough. The top face of the worm wheel 14 is covered by a cap 29 which telescopes with the shoulder 28 on the worm wheel and which has a flange 30 resting on the top of said shoulder. This cap 29 may be connected to the worm wheel 14 in any suitable manner so as to rotate therewith, but for the purpose of illustration I have shown a positive connection between the two including a pin 31 extending through the flange 30 and into a hole in the top of the shoulder 28. Mounted atop the cap 29 in any suitable manner is a shield 32 which serves to cover the reciprocating rod 33 connected to the cutter spindle 2.

The structure described up to this point is old in the art and forms no part of the present invention, and is shown and described merely for the sake of showing one application of my novel control device which is hereinafter described.

Referring now to Fig. 4, wherein a wiring diagram for the machine including my control device is shown, the usual manually operated switch S for controlling the motor 20 is located in the main circuit $L^1$—$L^2$ to the motor 20 and includes a normally open main switch 32 which is controlled by an energizing circuit including the relay 33 for holding the main switch closed. The manually operated stop button 34 is normally spring pressed closed and the start button 35 in the energizing circuit is normally spring pressed open. When the start button 35 is depressed the energizing circuit is completed whereupon the relay 33 is energized. Energization of the relay causes the main switch 32 to be closed completing the circuit to the motor 20. When the main switch is closed it connects the branch 36 to the energizing circuit behind the starting button so that the relay is not interrupted when the start button returns to its normally open position. To break both the energizing circuit and the main circuit, the stop button 34 is depressed.

The present invention includes connecting a normally closed interrupter switch 37 in the energizing circuit behind the relay 33, and locating it adjacent to cutter spindle 2 so that it can be intermittently opened by a contact rotating with the cutter spindle as will be fully hereinafter described. It will be understood by those skilled in the art that a momentary interruption of the energizing circuit by the interrupter switch 37 will cause the main switch 32 to snap to its open position to break the main circuit through the motor.

Referring now particularly to Fig. 2, a detailed description of the structure comprising the present invention will be described. An index member is mounted around the periphery of the cap 29 covering the worm wheel 14 to rotate therewith, and said index member comprises a split ring 39 which can be drawn down on the cap 29 by adjusting screws 40 to rotate with said cap, or can be relieved so as to be adjustable relative to said cap for the purpose hereinafter described. This index member is provided around its periphery with a plurality of tapped openings 41 into which conical ended pins 42 can be screw threaded and locked by means of jammed nuts 43.

Fastened to the frame of the machine adjacent to cap 29 is a switch box 44, see Figs. 1 and 2, which houses the interrupter switch 37 connected in the energizing circuit of the machine as shown and described above in connection with Fig. 4. Any type of switch will serve as an interrupter switch so long as it is adapted to be closed or opened through a slight movement of the switch lever, and for the purpose of illustration I have shown it as consisting of a well-known micro-switch which is itself normally open, see Figs. 3 and 4. The interrupter switch 37 is operated by a lever 45 one end of which is pivoted at 46 so that the arm 47 contacts and moves the contact point 48 inwardly or allows it to move outwardly under the action of a spring within the switch itself, said spring not being shown. The actuating means for the interrupter switch comprises a bell crank lever 49 which is pivoted in the switch box 44 by screw 50 so that one end 51 thereof will contact the end 52 of the lever 45 while the other end 53 of the bell crank extends through an opening 54 in the switch box and into the path of the pins 42 on the index member 39, the end 53 being provided with a roller 55. The switch 37 is held normally closed by the action of the spring 56 one end of which is fastened to the pin 57 fixed to the switch box 44, and the other end of which is fixed to the end 51 of the bellcrank 49, said spring normally acting to hold the bellcrank in the position shown in Fig. 3 wherein the end 51 thereof is abutted against the stop pin 58 in the switch box 44. A condenser 59 is shown hooked across the switch 37 for the purpose of preventing any excessive arcing in the switch, a condition which usually exists in switches which make and break a circuit through slight movement of the contact points.

The adjustment and operation of my novel control device is effected in the following manner. When a cutter 1 having three gaps 26, 26', 26'', 120 degrees apart, as shown in Figs. 5 and 6, is mounted on the cutter spindle 2, three conically ended pins 42 are screwed into openings 41 in the index member 39 so as to be 120 degrees apart. The adjusting screws 40 are then loosened and the index member is rotated on the cap 29 until one of the pins 42 contacts the roller 55 of the bellcrank 49 when the cutter spindle 2 is in position so that one of the gaps 26, 26', 26'' in the cutter is opposite the work spindle, as shown in Fig. 5. When the index member is thus adjusted and clamped in position, the machine is ready for operation and will be automatically stopped by the control device with the cutter spindle in a predetermined position wherein the gap of the cutter will be opposite the work spindle. After a new gear blank has been placed on the work spindle 4 the machine is started by pushing the start button 35 whereupon the cutter spindle 2 and the work spindle 4 rotate in unison in the direction indicated by the arrows, Figs. 5 and 6. The machine will continue to operate until a succeeding conical ended pin 42 on the index member contacts the bellcrank 49 to release the interrupter switch 37 whereupon the machine will stop with the cutter spindle in position where a succeeding gap in the cutter will be opposite the work spindle so that a new gear blank can be placed on the spindle for the one previously cut. The ends of the pin 42 are made conical so that the surface thereof contacting the roller 55 will be reduced to a minimum and there will be no tendency for the index member 39 to stop in such a position as to hold the bellcrank 53 in switch releasing position. The coasting due to the inertia of the machine or rotating part is sufficient to carry the conically pointed pins past the roller 55 thus leaving the switch in the closed position so that the machine can again be started by pushing the start button 35.

Although for the purpose of illustration I have shown by control device connected to a gear shaping machine using a three gap cutter, it will be readily understood that this control device can be adjusted to a cutter using any number of gaps by merely inserting or removing the pins 42 from the openings 41 in the index member so that the number of pins in the index member is equal to the number of gaps in the cutter, and are spaced the same number of degrees apart around the periphery of the index member as are the gaps around the cutter. It is further pointed out, that although this control device is particularly adapted to a gear shaping machine when using a gap cutter, it is to be understood that it is adaptable to a machine regardless of the type of cutter used so long as a stopping of the machine is required at a given time or after either or both the cutter spindle and the work spindle have rotated through a given arc relative to one another.

Although I have shown and described certain specific embodiments of my invention, I am fully aware that many modifications thereof are possible. My invention, therefore, is not to be restricted except in so far as is necessitated by the prior art and by the spirit of the appended claims.

What I claim is:

1. In an apparatus of the type described, the combination with a rotatable cutter spindle, a rotatable work spindle, a driving mechanism connected to said spindles for rotating the same in timed relation and including a prime mover, an index member mounted on one of said spindles for rotation therewith, of an energy supply means connected to said prime mover and including a control member for supervising the operation thereof, a switch means located for operation by said index member and adapted to be opened when said spindles are in predetermined relative positions, and an energizing circuit including an electro-magnetic member adjacent said control member and adapted when energized to move said control member for operation of said prime mover and also including said switch means which interrupts said energizing circuit when said spindles are in said predetermined relative positions.

2. In an apparatus of the type described, the combination with a rotatable cutter spindle, a rotatable work spindle, a driving mechanism connected to said spindles for rotating the same in timed relation and including an electric motor, an index member mounted on one of said spindles for rotation therewith, of a main electric circuit connecting said electric motor to the line, and including a main switch for making and breaking said main circuit, a second switch located for operation by said index member and adapted to be opened when said spindles are in predetermined relative positions, and an energizing circuit including an electro-magnetic member adjacent said main switch and adapted when energized to close said main switch, and also including said second switch which interrupts said energizing circuit when said spindles are in said predetermined relative positions.

3. In an apparatus of the type described, the combination with a rotatable cutter spindle, a rotatable work spindle, a driving mechanism connected to said spindles for rotating the same in timed relation and including an electric motor, and an index member mounted on said cutter spindle for rotation therewith, of a main electric circuit connecting said electric motor to the line, and including a main switch for making and breaking said main circuit, a second switch located for operation by said index member and adapted to be opened when said spindles are in predetermined relative positions, and an energizing circuit including an electro-magnetic member adjacent said main switch and also including said second switch which interrupts said energizing circuit when said spindles are in said predetermined relative position.

4. In an apparatus of the type described, the combination with a rotatable cutter, a rotatable work spindle, a driving mechanism connected to said spindles for rotating the same in timed relation, and including an electric motor, a main electric circuit connecting said motor to the line, and including a main switch for making and breaking said main circuit, of an energizing circuit including an electro-magnetic member adjacent said main switch and adapted when energized to close said main switch, and also including a second switch adapted to interrupt said energizing circuit to break the main circuit to the motor, an index member connected to said cutter spindle to rotate therewith, and a plurality of projections in spaced relation on said index member and adapted to contact and open said second switch at regular intervals whereby the apparatus is automatically stopped when said spindles are in predetermined relative positions.

5. In an apparatus of the type described, the combination with a rotatable cutter spindle, a rotatable work spindle, a driving mechanism connected to said spindle for rotating the same in timed relation, and including an electric motor, a main electric circuit connecting said motor to the line, and including a main switch for making and breaking said main circuit, of an energizing circuit including an electro-magnetic member adacent said main switch and adapted when energized to close said main switch, and also including a second switch adapted to interrupt said energizing circuit to break the main circuit to the motor, and an index member connected to said cutter spindle to rotate therewith and adapted to interrupt said second switch at intervals whereby the apparatus is stopped when the spindles are in predetermined relative positions, said index member comprising a ring having a plurality of openings spaced around the periphery thereof, said openings adapted to detachably receive pins which extend radially from said ring to engage and open said second switch.

6. In an apparatus of the type described, the combination with a rotatable cutter spindle, a cap for said cutter spindle and connected thereto to rotate therewith, a rotatable work spindle, a driving mechanism connected to said spindles for rotating the same in timed relation, and including an electric motor, a main electric circuit connecting said motor to the line, and including a main switch for making and breaking said main circuit, of an index member connected to said cap for rotation therewith, and comprising a pinch ring adjustably secured to said cap and having a plurality of spaced openings around its periphery for detachably receiving one or more pins, an energizing circuit including an electro-magnetic member adjacent said main switch and adapted when energized to close said main switch, and also including a second normally closed switch located in the path of said pins for operation thereby, whereby the energizing circuit is interrupted when said spindles are in predetermined relative positions.

7. In an apparatus of the type described, the combination with a rotatable cutter spindle, a rotatable work spindle, a driving mechanism connected to said spindles for rotating the same in timed relation, and including an electric motor, an index member connected directly to the cutter spindle for rotation therewith, of a main electric circuit connecting said motor to the line, and including a main manually operated switch for making and breaking said main circuit, an energizing circuit connected in parallel with said main circuit and including an electromagnetic member adjacent said main switch and adapted when energized to close said main switch, a normally closed switch in said energizing circuit located for operation by said index member, and adapted to interrupt said energizing circuit when the spindles are in predetermined positions.

8. In an apparatus of the type described, the combination with a rotatable cutter spindle, a rotatable work spindle, a driving mechanism connected to said spindles for rotating the same in timed relation, and including an electric motor, a circular index member concentric with said cutter spindle and connected thereto for rotation therewith, said index member provided with a plurality of openings around its periphery, each of said openings being spaced from one another and adapted to detachably receive pins which extend radially from the index member, of a main electric circuit connecting said motor to the line, and including a main switch for making and breaking said main circuit, a second switch located for operation by the pins on said index member and adapted to be opened when said spindles are in predetermined relative positions, and an energizing circuit including an electromagnetic member adjacent said main switch and adapted when energized to close said main switch, and also including said second switch which interrupts said energizing circuit when said spindles are in said predetermined relative positions.

9. In an apparatus of the type described, the combination with a rotatable cutter spindle, a rotatable work spindle, a driving mechanism connected to said spindles for rotating the same in timed relation, and including an electric motor, a pinch ring concentric with said cutter spindle and adapted when loosened to be rotated with respect to said cutter spindle and when tightened to be connected to said spindle for rotation therewith, said pinch ring provided with a plurality of threaded openings around its periphery in spaced relation, each of said openings adapted to detachably receive threaded pins which extend radially from the pinch ring, of a main electric circuit connecting said motor to the line, and including a main switch for making and breaking said main circuit, a second switch located for operation by the pins on said pinch ring and adapted to be opened when said spindles are in predetermined relative positions, and an energizing circuit including an electro-magnetic member adjacent said main switch and adapted when energized to close said main switch, and also includling said second switch which interrupts said energizing circuit when said spindles are in said predetermined relative positions.

LOUIS D. MARTIN.